July 14, 1942.   M. J. HERZBERGER   2,289,779
PHOTOGRAPHIC OBJECTIVE
Filed May 17, 1940
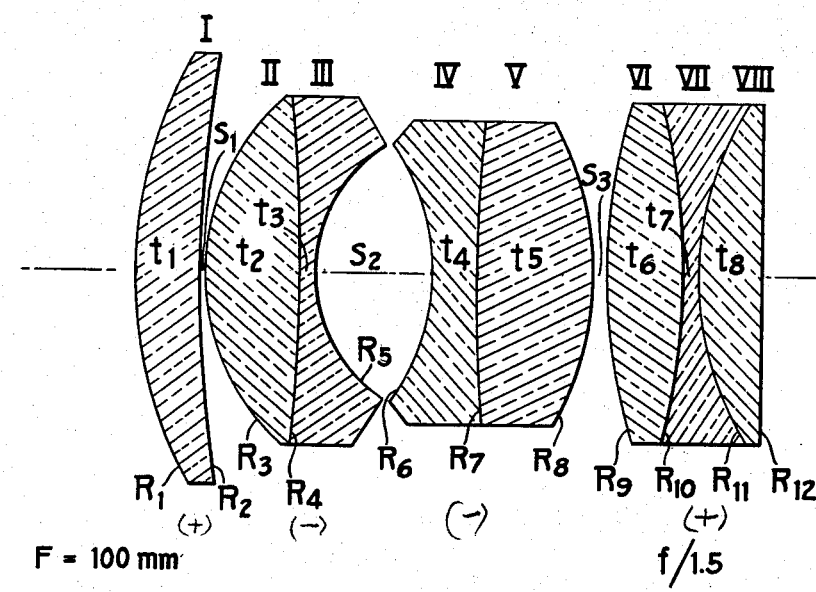
F = 100 mm       f/1.5
| LENS | GLASS | | RADII | SPACINGS |
|---|---|---|---|---|
| I | $N_D$ = 1.643 | $\nu$ = 47.8 | $R_1$ = + 79.1 mm | $t_1$ = 11.7 mm |
| | | | $R_2$ = + 760.0 | $S_1$ = .7 |
| II | = 1.639 | = 55.5 | $R_3$ = + 42.5 | $t_2$ = 17.9 |
| III | = 1.640 | = 34.6 | $R_4$ = − 431.0 | $t_3$ = 2.6 |
| | | | $R_5$ = + 26.9 | $S_2$ = 19.5 |
| IV | = 1.613 | = 37.0 | $R_6$ = − 39.9 | $t_4$ = 8.7 |
| V | = 1.744 | = 45.8 | $R_7$ = + 545.0 | $t_5$ = 21.6 |
| | | | $R_8$ = − 56.4 | $S_3$ = 2.8 |
| VI | = 1.744 | = 45.8 | $R_9$ = + 106.4 | $t_6$ = 13.9 |
| VII | = 1.613 | = 37.0 | $R_{10}$ = − 121.2 | $t_7$ = 3.4 |
| VIII | = 1.623 | = 58.1 | $R_{11}$ = + 56.8 | $t_8$ = 11.7 |
| | | | $R_{12}$ = ∞ | |
*MAXIMILIAN J. HERZBERGER*
INVENTOR
BY
ATTORNEY.

Patented July 14, 1942

2,289,779

UNITED STATES PATENT OFFICE 2,289,779

PHOTOGRAPHIC OBJECTIVE

Maximilian J. Herzberger, Rochester, N. Y., assignor to Eastman Kodak Company, Rochester, N. Y., a corporation of New Jersey Application May 17, 1940, Serial No. 335,785

12 Claims. (Cl. 88—57)

This invention relates to lenses and particularly to high aperture photographic objectives.

It is the object of the invention to provide a high aperture lens with high covering power and a high degree of correction for the various aberrations including spherical aberration, chromatic aberration, lateral color, curvature of field, astigmatism, sine condition, coma, distortion, Petzval condition, ghost images, vignetting, and flare.

It is a primary object of the invention to provide an f/1.5 lens covering up to 22 degrees or more from the axis with a flat field.

It is also an object of the invention to provide a lens with improved rim ray agreement and reduced distortion.

It is a specific object of this invention to provide all of these corrections to an extremely high degree without introducing chromatic aberrations.

Photographic objectives may be divided into certain types which are easily recognized by the lens designer. In a few rare instances, there are border line cases which are a little difficult to define. However, in the case of the present invention, the type of lens is well known, namely that having four components the outer two of which are positive and the inner two are meniscus highly concave toward a diaphragm positioned therebetween. The various components of this type of lens may have many known forms. As for example, the present invention may be combined with those described in copending applications, Serial Nos. 335,782, 335,783 and 335,784 filed concurrently herewith by George H. Aklin. The present invention is an improved form of that described in copending application, Serial No. 335,786 also filed concurrently herewith by Frederick and myself. As shown by U. S. 1,839,011, Bielicke, U. S. 2,012,822, Lee, U. S. 2,019,985, Lee and German 665,520, Laack, lenses of this type may have an air space in one or more of the components. Of course, the components themselves are air-spaced from one another.

The invention is not concerned with the front half of the lens i. e., the first two components and is only incidentally concerned with the third component. According to the invention, the above objects are accomplished by making the fourth component in the form of a triplet with a high index glass in the front element, preferably above 1.7 and at least .1 greater than the index of the middle element of the triplet. The cemented surface between these two elements is arranged to correct rim ray agreement by having a radius of curvature between $-F$ and infinity where F is the focal length of the objective. Preferably this radius of curvature is between $-F$ and $-2F$, the negative sign meaning it is concave to the incident light, but the exact value is not critical provided the high difference in index of refraction, i. e. high index break is present. The high refractive index of the front element of this component, particularly when a high index is also used in the rear element of the third component, gives an exceptionally flat field. However, there is a tendency toward chromatic aberration which is corrected by the second cemented surface of the triplet. Since this second cemented surface is primarily to correct color, I prefer to use substantially the same refractive index in the two adjacent elements. Using a high dispersive index in the rear element, about 15 or more greater than that of the middle element, the second cemented surface must be positive between .4F and 2F (convex to the incident light). On the other hand, a slight refractive index difference at this second cemented surface can easily be tolerated and can even be used in correcting the aberrations slightly.

In the accompanying drawings there is shown:

The cross section of a lens incorporating the invention.

The specifications of the embodiment shown in the drawing is as follows:

F = 100 mm.  f/1.5

| Lens | Glass | | Radii | Spacings |
|---|---|---|---|---|
| | $N_D$ | V | | |
| I | 1.643 | 47.8 | $R_1 = +79.1$ mm. | $T_1 = 11.7$ mm. |
| | | | $R_2 = +760.0$ | $S_1 = .7$ |
| II | 1.639 | 55.5 | $R_3 = +42.5$ | $T_2 = 17.9$ |
| | | | $R_4 = -431.0$ | |
| III | 1.640 | 34.6 | $R_5 = +26.9$ | $T_3 = 2.6$ |
| | | | $R_6 = -39.9$ | $S_2 = 19.5$ |
| IV | 1.613 | 37.0 | $R_7 = +545.0$ | $T_4 = 8.7$ |
| V | 1.744 | 45.8 | $R_8 = -56.4$ | $T_5 = 21.6$ |
| | | | $R_9 = +106.4$ | $S_3 = 2.8$ |
| VI | 1.744 | 45.8 | $R_{10} = -121.2$ | $T_6 = 13.9$ |
| VII | 1.613 | 37.0 | $R_{11} = +56.8$ | $T_7 = 3.4$ |
| VIII | 1.623 | 58.1 | $R_{12} = \infty$ | $T_8 = 11.7$ |

In the above example, the front component is a single lens, the inner two components are doublets and the rear component is according to the invention a triplet. The invention is equally applicable to all appropriate forms of the front three components which should thus follow the usual rules. For the simple form shown, these rules are that $R_1$ should be between $.3F$ and $F$, $F_2$ should have an absolute value greater than $F$, $R_3$ should be between $.3F$ and $.6F$, $R_4$ should have an absolute value greater than $F$, $R_5$ should be between $.2F$ and $.5F$, $R_6$ should be between $-.2F$ and $-.5F$, $R_7$ should have an absolute value greater than $F$, $R_8$ should be between $-.2F$ and $-.7F$, where $F$ is the focal length of the objective and $R_1$ to $R_8$ are respectively the radii of curvature of the refractive surfaces of the lens taken in order from front to rear.

The rear component according to the invention should have its front surface radius of curvature $R_9$ between $.75F$ and $5F$ and its rear surface radius of curvature $R_{12}$ between $-F$ and infinity. As pointed out above the front element of this triplet should have an index at least .1 greater than that of the middle element, the cemented surface radius of curvature $R_{10}$ should be between $-F$ and infinity and the cemented surface radius of curvature $R_{11}$ should be between $.4F$ and $2F$.

Having thus described the preferred embodiment of my invention, I wish to point out that it is not to be limited to this structure but is of the scope of the appended claims.

What I claim and desire to secure by Letters Patent of the United States is:

1. A photographic objective of the type having four air separated and axially spaced lens components of which the two outer ones are positive and the two inner ones are of meniscus form having highly concave surfaces turned toward a diaphragm therebetween characterized by the rear component consisting of three cemented elements the front one of which has an index of refraction at least .1 greater than that of the middle element, the radius of curvature of the front surface of this rear component being between $.75F$ and $5F$ where $F$ is the focal length of the objective, the radius of curvature of the next and cemented surface being between $-F$ and infinity, the radius of curvature of the third and cemented surface of this component being between $.4F$ and $2F$ and the rear surface having a radius of curvature between $-F$ and infinity.

2. A photographic objective according to claim 1 in which the rear element of the rear component has substantially the same index of refraction as the element adjacent thereto and has a dispersive index at least 15 greater than that of said adjacent element.

3. A photographic objective according to claim 1 in which the front element of the rear component is biconvex with an index of refraction greater than 1.7 and the other two elements have indices of refraction between 1.60 and 1.65.

4. A photographic objective consisting of four air separated and axially spaced lens components the front one being a single positive element, the two inner ones being meniscus doublets and having highly concave surfaces turned toward a diaphragm therebetween and the rear one being a triplet, the radii of curvature of the refractive surfaces being $R_1$ to $R_{12}$ respectively from front to back where $R_1$ is between $.3F$ and $F$, where $F$ is the focal length of the objective, $R_2$ has an absolute value greater than $F$, $R_3$ is between $.3F$ and $.6F$, $R_4$ has an absolute value greater than $F$, $R_5$ is between $.2F$ and $.5F$, $R_6$ is between $-.2F$ and $-.5F$, $R_7$ has an absolute value greater than $F$, $R_8$ is between $-.2F$ and $-.7F$, $R_9$ is between $.75F$ and $5F$, $R_{10}$ is between $-F$ and infinity, $R_{11}$ is between $.4F$ and $2F$ and $R_{12}$ is between $-F$ and infinity and the index of refraction of the front element of the rear component is at least .1 greater than that of the middle element of this component.

5. A photographic objective according to claim 4 in which the rear element of the third component and the front element of the rear component each have indices of refraction greater than 1.7.

6. A photographic objective of the type having four axially aligned components of which the two outer ones are positive and the two inner ones are meniscus ones, highly concave toward a diaphragm therebetween characterized by the third component immediately behind the diaphragm being compounded of at least two elements, the rear one of said two elements having an index of refraction greater than 1.7 and at least .05 greater than that of the front one of the two elements.

7. A photographic objective according to claim 6 in which said third component is a doublet consisting of said two elements only.

8. A photographic objective of the type having four axially aligned components of which the two outer ones are positive and the two inner ones are meniscus and highly concave toward a diaphragm therebetween, characterized by the third component immediately behind the diaphragm being compounded of at least two elements, the rear element of this third component having an index of refraction greater than 1.7 and the front element of this third component having an index of refraction less than 1.65.

9. A photographic objective of the type having four axially aligned components of which the two outer ones are positive and the two inner ones are meniscus and highly concave toward a diaphragm therebetween, characterized by the third component immediately behind the diaphragm being compounded of at least two elements, the rear element of this third component having an index of refraction greater than 1.70 and at least .05 greater than that of the front element of this third component.

10. A photographic objective according to claim 6 in which the rear one of said two elements has a dispersive index greater than that of the front one of the two elements.

11. A photographic objective according to claim 8 in which the rear element of the third component has a dispersive index greater than that of the front element of this third component.

12. A photographic objective according to claim 9 in which the rear element of the third component has a dispersive index greater than that of the front element of this component.

MAXIMILIAN J. HERZBERGER.